(12) United States Patent
Devendran et al.

(10) Patent No.: US 11,368,503 B2
(45) Date of Patent: Jun. 21, 2022

(54) AUTOMATED VIDEO POSITIONING DURING VIRTUAL CONFERENCING

(71) Applicant: KYNDRYL, INC., New York, NY (US)

(72) Inventors: Saravanan Devendran, Bangalore (IN); Thangadurai Muthusamy, Bangalore (IN); Aditya M. Burli, Bangalore (IN)

(73) Assignee: Kyndryl, Inc., New York, NY (US)

( * ) Notice: Subject to any disclaimer, the term of this patent is extended or adjusted under 35 U.S.C. 154(b) by 63 days.

(21) Appl. No.: 16/451,147

(22) Filed: Jun. 25, 2019

(65) Prior Publication Data

US 2020/0412780 A1 Dec. 31, 2020

(51) Int. Cl.
*G06F 3/048* (2013.01)
*H04L 65/4053* (2022.01)
*H04L 65/60* (2022.01)
*G06N 20/00* (2019.01)
*H04L 67/306* (2022.01)
*G10L 15/22* (2006.01)
*G06F 40/40* (2020.01)

(52) U.S. Cl.
CPC ......... *H04L 65/4053* (2013.01); *G06N 20/00* (2019.01); *H04L 65/604* (2013.01); *H04L 67/306* (2013.01); *G06F 40/40* (2020.01); *G10L 15/22* (2013.01)

(58) Field of Classification Search
CPC .... G06F 3/0482; G06F 40/166; G06F 40/103; H04L 51/24; H04L 51/32; H04L 51/04; H04L 51/10
See application file for complete search history.

(56) References Cited

U.S. PATENT DOCUMENTS

| | | | |
|---|---|---|---|
| 9,088,694 B2 | 7/2015 | Navon et al. | |
| 9,167,201 B2 | 10/2015 | Six et al. | |
| 9,336,528 B2 * | 5/2016 | Beaton | G06Q 30/02 |
| 9,800,931 B1 | 10/2017 | Tangeland et al. | |

(Continued)

FOREIGN PATENT DOCUMENTS

EP 3114848 A1 1/2017

OTHER PUBLICATIONS

Anonymous, "Method and system for tracking the focus area of a presenter and displaying the same during video conference," https://priorart.ip.com//IPCOM/000252958, IP.Com No. IPCOM000252958D, Feb. 23, 2018, 3 pgs.

(Continued)

*Primary Examiner* — William C Trapanese
(74) *Attorney, Agent, or Firm* — Ken Han; George S. Blasiak; Heslin Rothenberg Farley & Mesiti PC

(57) ABSTRACT

Provided is a method, computer program product, and virtual conferencing system for automatically positioning a video thumbnail within an area on a display during a virtual conferencing session. A processor may receive a data stream of a virtual conferencing session. The data stream includes visual data associated with a presentation. The processor may analyze the visual data to identify a blank space area in the visual data. The processor may display the visual data to one or more users of the virtual conferencing session. The processor may display a video thumbnail of a presenter in the blank space area.

20 Claims, 7 Drawing Sheets

(56) References Cited

U.S. PATENT DOCUMENTS

| | | | |
|---|---|---|---|
| 2007/0279484 A1* | 12/2007 | Derocher | H04N 7/15 348/14.09 |
| 2009/0220165 A1* | 9/2009 | Liu | G06F 16/9577 382/256 |
| 2010/0153831 A1* | 6/2010 | Beaton | G06Q 30/02 715/201 |
| 2012/0249877 A1* | 10/2012 | Hernandez Costa | H04N 21/4316 348/564 |
| 2014/0232814 A1* | 8/2014 | Malhotra | H04N 7/15 348/14.07 |
| 2015/0177964 A1* | 6/2015 | Spirer | G06F 16/4393 715/732 |
| 2016/0132222 A1* | 5/2016 | Yoo | G06F 3/016 715/763 |
| 2016/0173944 A1* | 6/2016 | Kilar | H04N 21/458 725/12 |
| 2016/0343351 A1* | 11/2016 | Chen | G06F 3/1454 |
| 2017/0076713 A1 | 3/2017 | Gildein, II et al. | |
| 2018/0308252 A1* | 10/2018 | Alonso | G06F 3/013 |

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

US 11,368,503 B2

AUTOMATED VIDEO POSITIONING DURING VIRTUAL CONFERENCING

BACKGROUND

The present disclosure relates generally to the field of virtual conferencing, and more specifically, to automatically positioning a video thumbnail within an area on a display during a virtual conferencing session.

Virtual conferencing (e.g., web conferencing, video conferencing, etc.) has become a ubiquitous communication tool for conducting business in the modern world. Many businesses use virtual conferencing to hold virtual meetings where users can collaborate with each other via audio, visual, and textual mediums. In many instances, a virtual conferencing session may include multiple mediums displayed on a screen at the same time. For example, a virtual conferencing session may include both a slide presentation and a video feed of a presenter on the same screen.

SUMMARY

Embodiments of the present disclosure include a method for automatically positioning a video thumbnail within an area on a display during a virtual conferencing session. A processor may receive a data stream of a virtual conferencing session. The data stream includes visual data associated with a presentation. The processor may analyze the visual data to identify a blank space area in the visual data. The processor may display the visual data to one or more users of the virtual conferencing session. The processor may display a video thumbnail of a presenter in the blank space area.

Additional embodiments of the present disclosure include a system for positioning a video thumbnail within an area on a display during a virtual conferencing session. The system may receive a data stream of a virtual conferencing session. The data stream includes visual data associated with a presentation, spoken content of a presenter, and a video thumbnail of a presenter. The system may analyze the visual data to identify a blank space area in the visual data. The system may analyze, using natural language processing, the spoken content of the presenter. The system may identify, based on the analyzed spoken content, a non-focus portion of the visual data. The system may position the video thumbnail of the presenter in the blank space area, the non-focus portion, or both.

Further embodiments of the present disclosure include a computer program product for positioning a video thumbnail within an area on a display during a virtual conferencing session. A processor may receive a data stream of a virtual conferencing session. The data stream includes visual data associated with a presentation, spoken content of a presenter, and a video thumbnail of the presenter. The processor may determine, by analyzing the spoken content using natural language processing and the visual data, a non-focus portion of the visual data. The processor may display the visual data and the video thumbnail of the presenter to one or more users of the virtual conferencing session, such that the video thumbnail of the presenter is displayed over the non-focus portion of the visual data.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
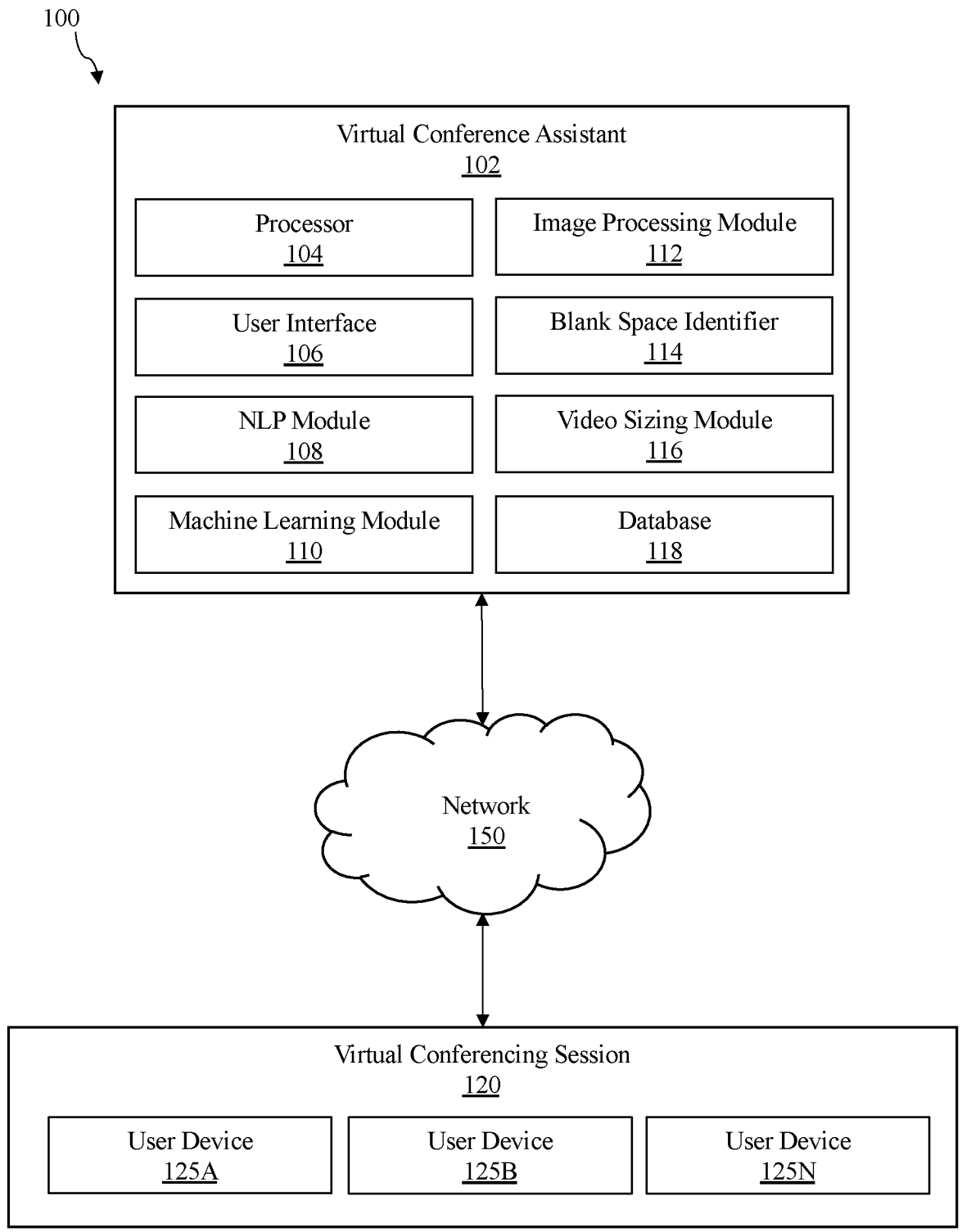
FIG. 1 illustrates a block diagram of a virtual conferencing system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of virtual conferencing, and more particularly to positioning a video thumbnail within an area on a display during a virtual conferencing session. While the present disclosure is not necessarily limited to such applications, various aspects of the disclosure may be appreciated through a discussion of various examples using this context.

Virtual conferencing (e.g., web conferencing, video conferencing, etc.) has become a ubiquitous communication tool for conducting business in the modern world. Many businesses use virtual conferencing to hold virtual meetings where users can collaborate with each other via audio, visual, and textual mediums. In many instances, a virtual conferencing session may include multiple mediums displayed on screen at the same time. For example, a virtual conferencing session may include various types of visual data, such as a slide presentation, text box, and/or shared document accompanying a video feed (e.g., video thumbnail) of a presenter, displayed on the same screen.

In some instances, the video thumbnail of the presenter may overlap and obstruct the visual data (e.g., written content and/or image content of the slide presentation/text box/shared document) when displayed on the same screen requiring a user participating in the virtual conference to adjust the size and/or the positioning of the video thumbnail. Further, as the presenter proceeds through the visual data, the video thumbnail may obstruct subsequent slides/shared documents depending on the positioning of the video thumbnail relative to the visual data. As a result, the user must reposition the video thumbnail multiple times to prevent obstructing the visual data during the virtual conferencing session. Requiring a user to continually readjust a video thumbnail during the virtual conferencing session may distract the user and/or other users from the presentation.

Aspects of the present disclosure relate to automatically positioning a video thumbnail within an area on a display during a virtual conferencing session. In embodiments, a virtual conferencing system may receive a data stream of a virtual conferencing session. The virtual conferencing session may include various types of visual data. For example, the virtual conferencing session may include written content (e.g., slides, portable document file (pdf) documents, chat boxes, etc.), spoken content (e.g., live audio) from one or more users, and/or image content (e.g., live video feed, charts, pictures, etc.).

Once the data steam is received, the system may identify a blank space area relative to visual data from the data stream. For example, the system may analyze the data stream using image recognition analysis to determine a blank space area from the display that does not include text or images. In embodiments, substantially all pixels of the blank space area are effectively a single color (e.g., a white background on a document containing no text). For example, the blank space area may include soft or color gradients containing no text or images.

In embodiments, once the blank space area is determined, the system may analyze spoken content of a presenter from the data stream and written content from the visual data using natural language processing (NLP). Based on the analyzing, the system may identify a non-focus portion of the visual data. For example, the system may analyze spoken content from a presenter during a slide presentation and correlate the spoken content to the written content on a slide. If the system determines the spoken content does not refer to the written content within the slide, or that the amount of time since the spoken content has referred to the written content on the slide exceeds a time threshold, the system may identify the written content as a non-focus portion of the slide. For example, the system may determine that a paragraph on a slide is a non-focus portion based on the subject/context of the spoken content being different from the written content.

In embodiments, once the blank space area and the non-focus portion are identified, the system automatically positions the video thumbnail in an area on a display covering the blank space area and/or the non-focus portion of the visual data. For example, the system may determine that a slide presentation contains a blank space area having no text or images (e.g., graphs, pictures, charts, etc.). However, this blank space area may not adequately fit a video thumbnail that displays the presenter at a resolution and size that is preferable to a user. Therefore, the system may position the video thumbnail over both the identified blank space area and the non-focus portion of the slide in order to adequately display the video feed while preventing obstruction of any relevant portions of the visual data (e.g., written content, image content, etc.).

In embodiments, the virtual conferencing system may identify subsequent blank space areas and non-focus portions for subsequently displayed visual data and reposition the video thumbnail accordingly. For example, a user may share a text document having multiple pages or change from one type of document to another during the virtual conferencing session. As the user moves from page to page or document to document, the text and/or images in the respective document may contain a different layout (e.g., the document may include images, graphs, varied spacing, etc.). In this instance, the system will identify any new blank space area and/or non-focus portion relative to the visual data of the document as the document layout changes on the screen and the presenter proceeds through the respective document(s). Once both the blank space area and non-focus portion are identified, the system will reposition the video thumbnail accordingly. In this way, as the user scrolls through the pages of the document or shares new documents the system will automatically reposition the video thumbnail to areas only covering identified blank space areas and/or the non-focus portions of the displayed document.

In embodiments, the system may determine from the spoken content that a presenter is no longer referring to any of the visual data from the data stream. This may be performed by analyzing the spoken content and the visual data using NLP. For example, the system may determine that a presenter of a slide presentation is no longer speaking about a respective slide based on the subject and/or context of the spoken content relative to the written content and/or image content of the slide. In response to the determination, the system may perform an action. In embodiments, the action may include expanding the video thumbnail, zooming in on the presenter on the video feed, and/or transitioning to a second visual data. For example, the system may determine the presenter has finished referring to a slide by determining that a predetermined time threshold has passed during which the presenter has not spoken about, or otherwise referred to, any of the content from the slide. Once this determination is made, the system may expand the video thumbnail to cover the slide presentation. In this way, the system enables a user participating in the virtual conferencing session to focus on the presenter once the visual data displayed on the screen has been discussed.

In embodiments, the virtual conferencing system may use machine learning to analyze historical data corresponding to actions performed by one or more users when manually positioning the video thumbnail relative to the visual data. For example, the system may determine, based on user action data, that a user only positions the video thumbnail over blank space areas rather than over non-focus portions of the visual data. Once the system identifies this preference, the system may update a user profile associated with the specific user to primarily or substantially only position the video thumbnail over blank space areas. In embodiments, the system may utilize crowdsourcing data to improve predictions for sizing and positioning of the video thumbnail. For example, the system may determine from crowdsourcing that most users prefer a minimum/maximum size video thumbnail relative to visual data displayed on their screen.

While automatically positioning a video thumbnail relative to a slide presentation is discussed as an example herein, this is not limiting on the implementation of the system. Embodiments of the present disclosure may be applied to various other forms of digital media when displayed in a virtual conferencing session. For example, the system may analyze blank space areas and/or non-focus portions of visual data for various shared windows such as chat boxes, websites, and/or textual documents to determine the appropriate positioning of a video thumbnail to prevent obscuring relevant information. In another embodiment, the system may reposition other types of windows relative to the video thumbnail and/or the visual data. For example, rather than repositioning the video thumbnail relative to the visual data, the system may reposition and/or size a chat box relative to the video thumbnail and/or any type of visual data to fit each type of window/thumbnail on a user's screen at a preferred size while preventing obscuring any focus portion of the visual data.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of a virtual conferencing system 100, in accordance with embodiments of the present disclosure. In the illustrated embodiment, virtual conferencing system 100 includes a virtual conference assistant 102 that is communicatively coupled to a virtual conferencing session 120 via network 150. In the illustrated embodiment, the virtual conferencing session 120 includes user device 125A, user device 125B, and user device 125N (collectively referred to as user devices 125). In other embodiments, additional or fewer user devices 125 may be included in the virtual conferencing session 120. It is contemplated that the user devices 125 are operated by one or more users within the virtual conferencing session 120. The user devices 125 may be any type of device (e.g., computer, smartphone, tablet, etc.) configured to communicatively connect to the virtual conferencing session 120. The user devices 125 and the virtual conference assistant 102 may be any type of computer system and may be substantially similar to computer system 1101 of FIG. 6. In embodiments, the user devices 125 may communicate with the virtual conferencing assistant 102 via the network 150. The user devices 125 may also communicate with one another via the network 150.

The network 150 may be any type of communication network, such as a wireless network or a cloud computing network. The network 150 may be substantially similar to, or the same as, cloud computing environment 50 described in FIG. 7 and FIG. 8. In some embodiments, the network 150 can be implemented using any number of any suitable communications media. For example, the network may be a wide area network (WAN), a local area network (LAN), an internet, or an intranet. In certain embodiments, the various systems may be local to each other, and communicate via any appropriate local communication medium.

For example, virtual conference assistant 102 may communicate with user device 125A and/or user device 125B using a WAN, one or more hardwire connections (e.g., an Ethernet cable) and/or wireless communication networks. In some embodiments, the various systems may be communicatively coupled using a combination of one or more networks and/or one or more local connections. For example, virtual conference assistant 102 may communicate with user device 125A using a hardwired connection, while communication between the virtual conference assistant 102 and user device 125B may be through a wireless communication network.

In the illustrated embodiment, virtual conference assistant 102 includes processor 104, user interface (UI) 106, natural language processing (NLP) module 108, image processing module 112, blank space identifier 114, and video sizing module 116.

In embodiments, NLP module 108 is configured to analyze both spoken content and visual data of the virtual conferencing session 120. For example, NLP module 108 may analyze the spoken content of a presenter participating in the virtual conferencing session and correlate the spoken content with written content (e.g., text in a document, words contained in a slide presentation, etc.) from the visual data displayed on the screen of one or more user devices 125. In embodiments, the NLP module 108 may determine a non-focus portion of the written content based on analyzing the spoken content and written content from the data stream. For example, the NLP module 108 may determine that a respective paragraph on a slide is a non-focus portion because the presenter has not referred to the paragraph for a predetermined time threshold. The virtual conference assistant 102 may utilize the identified non-focus portion of the written content for video thumbnail placement.

In embodiments, image processing module 112 is configured to analyze image data taken from a data stream of the virtual conferencing session 120. For example, the image processing module 112 may identify through image analysis that a slide from a presentation contains written paragraphs and graphical images. In embodiments, the image processing module 112 may identify various images and classify them according to what is depicted in the image. For example, the image processing module 112 may classify an image of a graph containing the word "chart" as a chart and/or graph. The classification of the images from the visual data allows the system to determine from the spoken content whether the presenter is referring to the image or the written content from the visual data. For example, the system may analyze the context of the spoken content from the presenter (using NLP) and determine the presenter is referring to a chart on a slide because of the presence of the words "chart" or "graph" spoken by the presenter. The system may also detect other various words or phrases relating to the images, such has phrases discussing numerical data, phrases referencing the identified image, etc. Classifying the images allows the system to determine if the image content from the visual data is considered a non-focus portion by correlating the classification with the spoken content.

In embodiments, blank space identifier 114 will use the image processing data to determine blank space areas relative to the visual data. A blank space area is an area where substantially all pixels of the area are effectively a single color. For example, a blue background of a slide may be considered a blank space area since it contains no other pixels generated from text or images.

In embodiments, video sizing module 116 is configured to adjust the size and position of a video thumbnail (e.g., video feed, video window, etc.) based on the identified blank space area and any identified non-focus portion of the visual data. For example, the video sizing module 116 will adjust the size and positioning of the video thumbnail to only cover the identified blank space area and/or the non-focus portion while allowing any relevant written content and/or image content of the visual data to be seen by the user participating in the virtual conferencing session 120.

In the illustrated embodiment, the virtual conference assistant 102 includes machine learning module 110 and database 118. Machine learning module 110 may comprise various machine learning engines (artificial neural network, correlation engines, reinforcement feedback learning model, supervised/unsupervised learning model, etc.) configured to analyze data generated from the virtual conferencing session 120. In embodiments, machine learning module 110 may analyze historical user data and/or crowdsourcing data generated from the user devices 125.

For example, machine learning module 110 may analyze historical data generated from actions performed by the user or other similar users when manually adjusting/positioning the video thumbnail in relation to visual data displayed on their screen. The analyzed historical and/or crowdsourced data may be used to improve predictions for sizing and positioning of the video thumbnail according to user preferences. For example, the machine learning module 110 may use unsupervised learning algorithms to group identified blank spaces, derive properties from the identified blank spaces, relate the properties with the user preferences, and use this information to predict the correct positioning and size of the video feed in current and/or subsequent virtual conferencing sessions.

In embodiments, the machine learning module 110 may utilize a feedback learning model to collect user preferences and positioning preferences to reinforce the supervised and unsupervised models. Over time, the virtual conference assistant 102 can become more accurate in properly adjusting the video thumbnail according to the user's preferences. For example, a user with an eye impairment may prefer positioning the video thumbnail in line with their dominant eye when possible. In this way, the machine learning module may learn from the user's actions to determine preferences for placement. The virtual conference assistant may store the user preferences in a user profile located on database 118.

FIG. 1 is intended to depict the representative major components of the virtual conferencing system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with the virtual conferencing system 100 may not be present, and the arrangement of components may vary.

For example, while FIG. 1 illustrates an example virtual conferencing system 100 having a single virtual conference assistant 102 and a single virtual conferencing session 120 comprising three user devices 125, suitable network architectures for implementing embodiments of this disclosure may include any number of virtual conference assistants, virtual conferencing session, and user devices. The various models, modules, systems, and components illustrated in FIG. 1 may exist, if at all, across a plurality of virtual conference assistants, virtual conferencing sessions, and user devices.

Figure 2A:
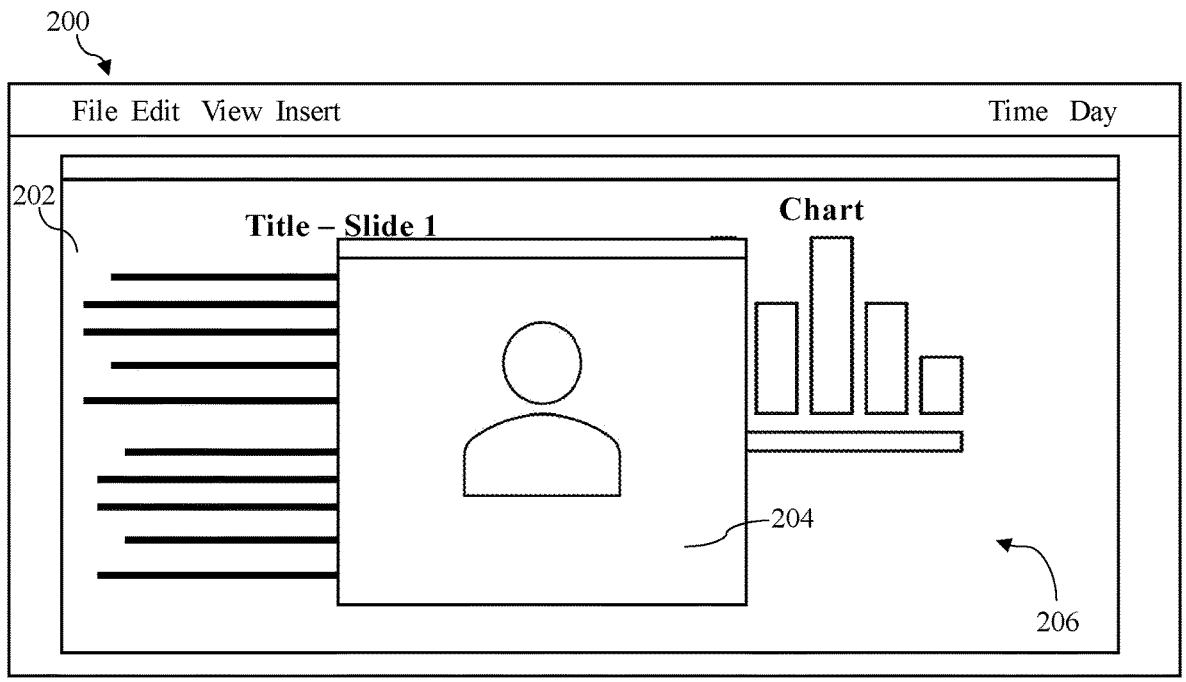
FIG. 2A illustrates an example virtual conferencing session, in accordance with embodiments of the present disclosure.

Referring now to FIG. 2A, shown is an example virtual conferencing session 200, in accordance with embodiments of the present disclosure. In the illustrated embodiment, the virtual conferencing session 200 is displayed on a screen (e.g., user interface) showing a slide 202 of a slide presentation and a video thumbnail 204. The video thumbnail 204 depicts a video feed of a presenter. The slide 202 includes visual data comprising of both written content (e.g., shown as lines representing text of paragraphs) and image content (e.g., the chart). The slide 202 further includes a blank space area 206. The blank space area 206 comprises substantially all pixels of a single color (here shown as white having no additional pixel colors). In the illustrated embodiment, the video thumbnail 204 is partially obstructing the view of the slide 202 which may occur when a user first joins the virtual conferencing session 200.

Figure 2B:
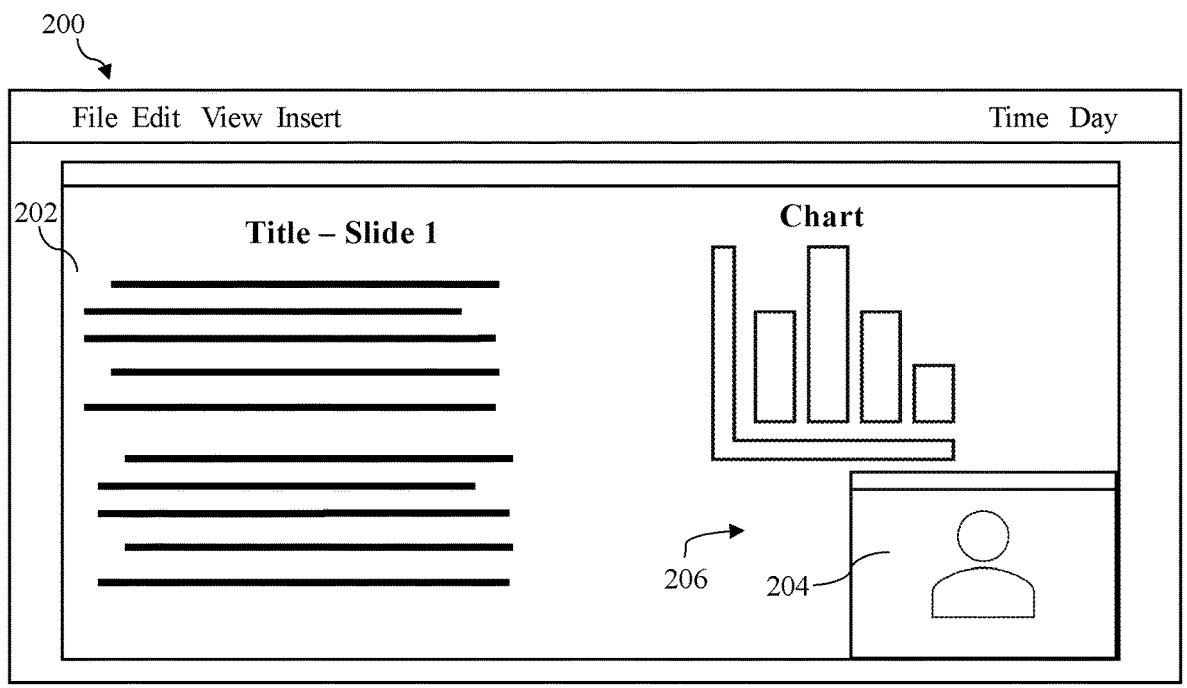
FIG. 2B illustrates an example virtual conferencing session with a video thumbnail positioned over a blank space area, in accordance with embodiments of the present disclosure.

Referring now to FIG. 2B, shown is an example virtual conferencing session 200 having a video thumbnail 204 positioned over a blank space area 206, in accordance with embodiments of the present disclosure. In the illustrated embodiment, the system is configured to identify the blank space area 206 and position the video thumbnail 204 within the blank space area 206 accordingly. The system may identify the blank space area 206 by using image processing that detects an area on the slide 202 that does not contain any images or text. Once identified, the system automatically adjusts the size and position of the video thumbnail 204 relative to the blank space area 206. In this way, the system automatically positions the video thumbnail 204 in an area that will not obstruct the user's view of relevant portions of the slides/document during the virtual conferencing session 200.

Figure 2C:
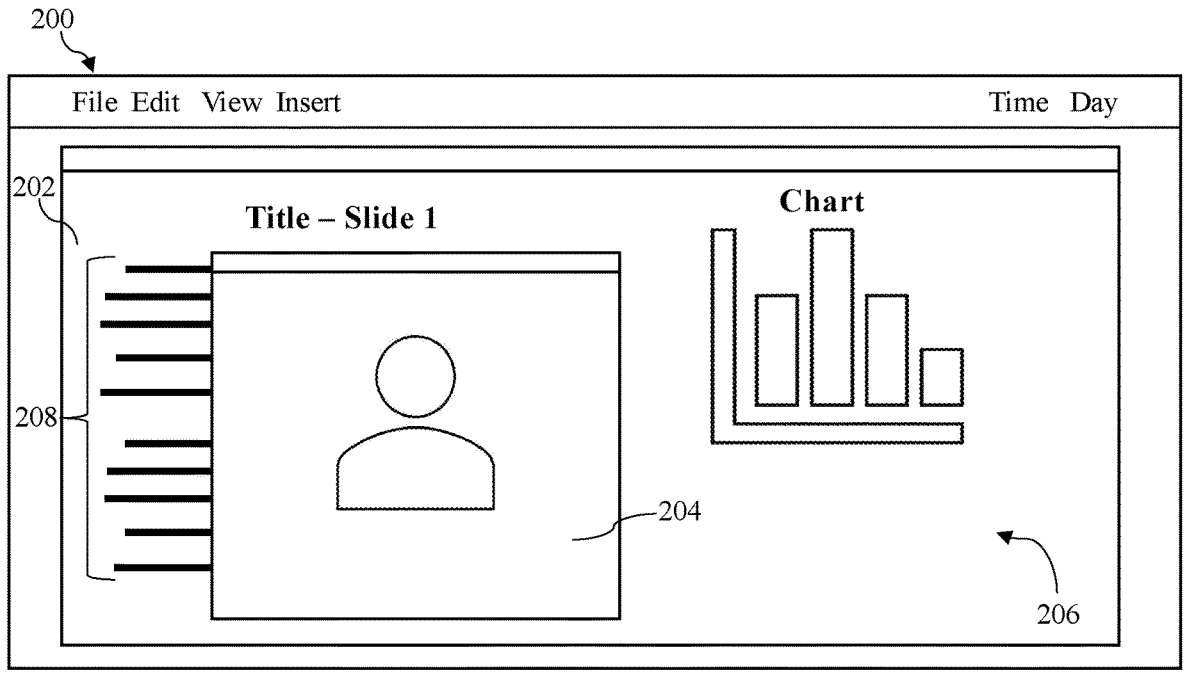
FIG. 2C illustrates an example virtual conferencing session with a video thumbnail positioned over a non-focus portion of a slide, in accordance with embodiments of the present disclosure.

Referring now to FIG. 2C, shown is an example virtual conferencing session 200 having a video thumbnail 204 positioned over a non-focus portion 208 of a slide 202, in accordance with embodiments of the present disclosure. In embodiments, the system may determine through natural language processing and image processing that the presenter is no longer referring to written content (referred to as non-focus portion 208) and/or image content from the slide. The system may determine the non-focus portion 208 by analyzing the presenter's spoken content taken from the data stream of the virtual conferencing session 200 and correlating the spoken content with the written content and/or image content from the slide 202.

For example, the presenter may refer to the text portion of the slide 202 while giving a presentation. Once the presenter has finished discussing this text portion, the system may determine that the text is now considered a non-focus portion 208 of the slide 202 since it has previously been referred to. In embodiments, the system may determine the non-focus portion 208 by utilizing a predetermined time threshold. For example, once the presenter has referred to the text, the system may wait a predetermined time (e.g., 3 mins) until identifying the text as non-focus portion 208. This prevents the system from covering the text prematurely in an instance where the presenter may refer to the text in a later portion of the presentation. The system may make the determination by analyzing the context of the spoken content relative to the written content.

In embodiments, once the non-focus portion 208 has been identified, the system may automatically position the video thumbnail 204 over the non-focus portion 208 and/or blank space area 206 allowing the user to see other relevant areas of the slide (e.g., the chart). In this way, the system automatically positions the video thumbnail 204 without the user manually positioning the thumbnail during the virtual conferencing session.

In embodiments, the system may utilize both the non-focus portion 208 and the blank space area 206 as a location for placement of the video thumbnail 204. The system may further utilize machine learning to determine appropriate sizing and placement of the video thumbnail by evaluating user actions when manually adjusting the video thumbnail during previous and/or current virtual conferencing sessions.

Figure 3:
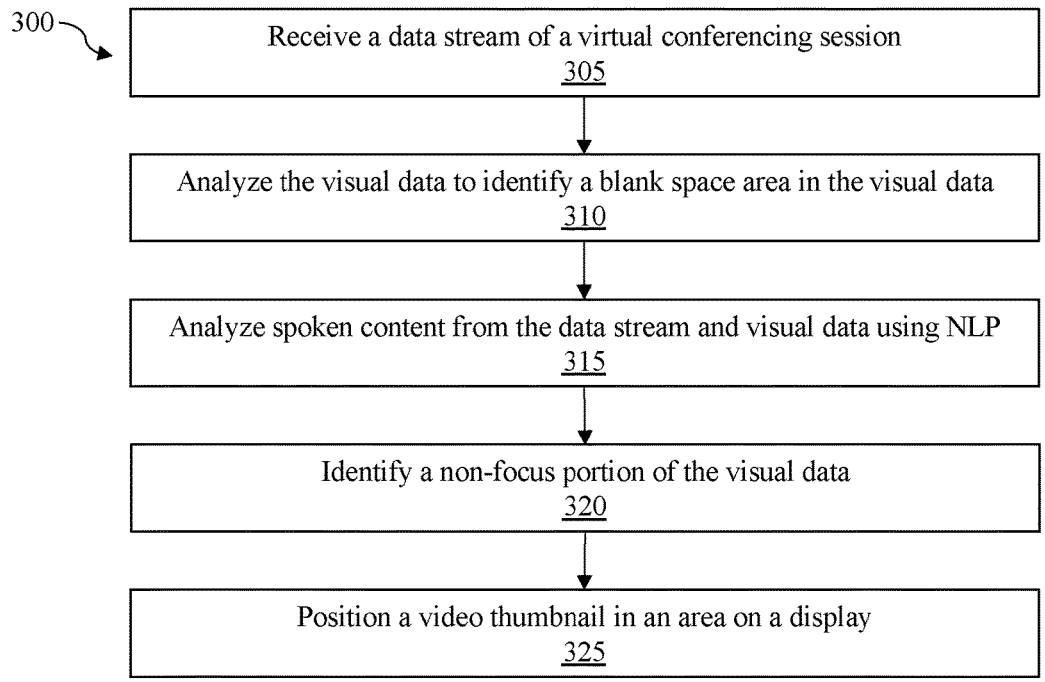
FIG. 3 illustrates a flow diagram of an example process for positioning a video thumbnail, in accordance with embodiments of the present disclosure.

Referring now to FIG. 3, shown is a flow diagram of an example process 300 for positioning a video thumbnail, in accordance with embodiments of the present disclosure. The process 300 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 300 is a computer-implemented process. The process 300 may be performed by processor 104 exemplified in FIG. 1.

The process 300 begins by receiving a data stream of a virtual conferencing session. This is illustrated at step 305. The data stream may comprise various forms of data, such as audio data and visual data. For example, the data stream may include an audio/video feed of a user (e.g., presenter) and a shared screen of a text document. The data stream may be displayed on the screen for each user participating in the virtual conferencing session.

The process 300 continues by identifying a blank space area relative to the visual data from the data stream. This is illustrated at step 310. The system will identify an area of the visual data that does not contain any text or images. For example, a slide from a slide presentation may have various blank spaces containing no texts or images (e.g., blank space area 206 shown in FIG. 2A-2C). The system may identify the blank space area using image processing.

The process 300 continues by analyzing, using natural language processing, spoken content from the data stream and the visual data. This is illustrated at step 315. In embodiments, the system will analyze both the spoken content and any written content of the visual content to identify whether the presenter is referring to the visual data. The system may do this by analyzing the context of the spoken content and correlating it to the written content displayed on the user's screen. In embodiments, the system may analyze the classification of any images contained in the visual data and correlate the classification of the image to the spoken content. For example, during image processing the system may classify an image depicting a tree as a "tree." This allows the system to identify from the context of the spoken content if the presenter is referring to the written content and or the image content.

The process 300 continues by identifying, based on the analyzing at step 315, a non-focus portion of the visual data. This is illustrated at step 320. The system will identify the non-focus portion of the visual data by determining which portions of the visual data (e.g., written content and/or image content) are not being referred to by the presenter. For example, any written content that has not been referred to by the presenter, or that has not been referred to for an amount of time exceeding a time threshold, may be identified as a non-focus portion.

The process 300 continues by positioning a video thumbnail in an area on a display. This is illustrated at step 325. In embodiments, the area on the display comprises the blank space area, the non-focus portion, or both. For example, the system may position the video thumbnail such that it only obstructs the identified blank space area and/or the non-focus portion of the visual data displayed on the user's screen. This allows the user to see any relevant or focused portions of the visual data while the presenter is discussing them. In embodiments, if the presenter's spoken content refers to a previously identified non-focus portion of the visual data during the virtual conferencing session, the system may reposition the video thumbnail accordingly.

Figure 4:
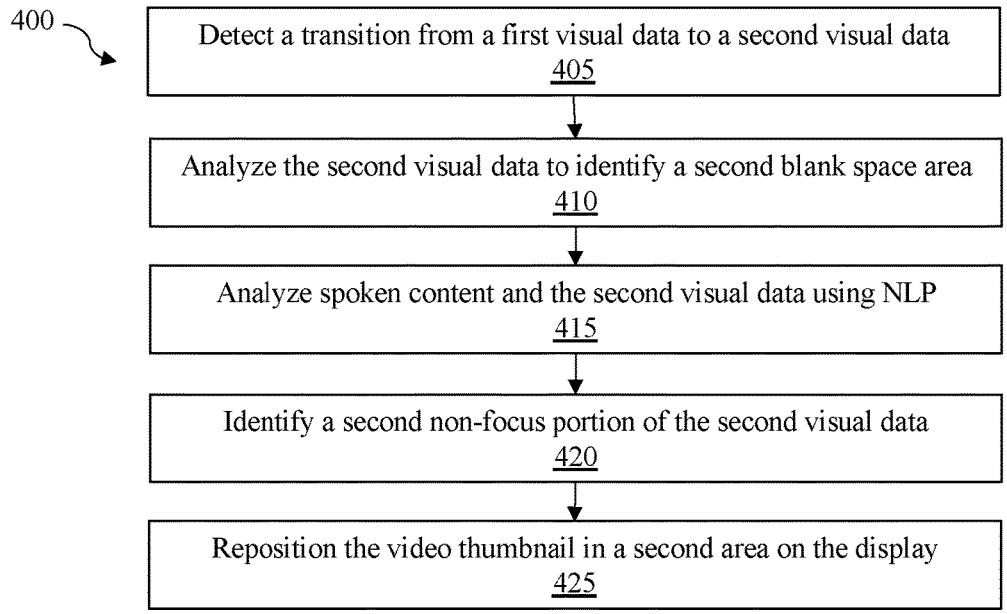
FIG. 4 illustrates a flow diagram of an example process for repositioning a video thumbnail for a second written content, in accordance with embodiments of the present disclosure.

Referring now to FIG. 4, shown is a flow diagram of an example process 400 for repositioning a video thumbnail for a second written content, in accordance with embodiments of the present disclosure. Process 400 may be in addition to or a subset of process 300. The process 400 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 400 is a computer-implemented process. The process 400 may be performed by processor 104 exemplified in FIG. 1.

The process 400 begins by detecting a transition from a first visual data to a second visual data. This is illustrated at step 405. For example, a presenter of a slide presentation may move to a subsequent slide (e.g., second visual data) in a slide presentation or share a new document within the conferencing session. Once the slide changes or a new document is detected, the process 400 continues by analyzing the second visual data displayed on the screen in order to identify any new blank space area (e.g., second blank space area) relative to the second visual data. This is illustrated at step 410.

In embodiments, the process 400 may continue by analyzing, using natural language processing, the spoken content from the data stream and second visual data to identify a second non-focus portion of the second visual data. This is illustrated at step 415. For example, the system will analyze the visual data (e.g., using NLP for written content, and image processing for classifying image content) of the subsequent slide/new document and correlate the visual data to the spoken content of the presenter of the virtual conferencing session. Once analyzed, the process 400 continues by identifying a second non-focus portion of the second visual data. This is illustrated at step 420. For example, the system may identify a foot note paragraph as a non-focus portion of the written content of the subsequent slide/new document based on the context of the spoken content.

Once the second non-focused portion is identified the process 400 continues by repositioning the video thumbnail in a second area on the display. The is illustrated at step 425. For example, the system may reposition the video thumbnail to a location on the display that is different than the previous location relative to the preceding slide or document. In this way, as the visual data shared on the screen during the conferencing session changes, the system will reposition the video thumbnail to prevent obscuring any relevant portions of the visual data.

Figure 5:
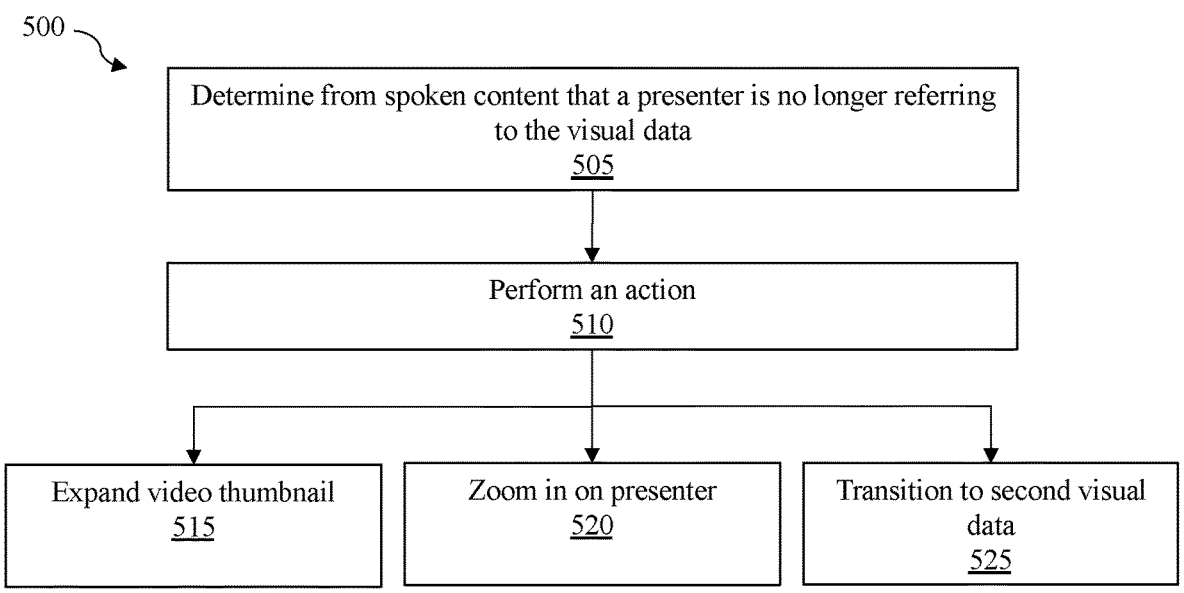
FIG. 5 illustrates a flow diagram of an example process for performing an action in response to determining a presenter is no longer referring to written content, in accordance with embodiments of the present disclosure.

Referring now to FIG. 5, shown is a flow diagram of an example process 500 for performing an action in response to determining a presenter is no longer referring to the visual data, in accordance with embodiments of the present disclosure. Process 500 may be in addition to or a subset of process 300 and/or 400. The process 500 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 500 is a computer-implemented process. The process 500 may be performed by processor 104 exemplified in FIG. 1.

The process 500 begins by determining, using natural language processing on the spoken content, that a presenter is no longer referring to the visual data. This is illustrated at step 505. In embodiments, the system may use various prediction thresholds to determine if the presenter is no longer referring to the visual data. For example, the system may utilize a time threshold to determine that the presenter has not referred to any of the written content or classified images on a respective slide within the last 2 minutes. In such an instance, the system may determine that the presenter is finished with the visual content on the slide.

Once the system has determined the presenter is no longer referring to any of the visual content, the process 500 continues by performing an action. This is illustrated at step 510. For example, if the system has determined the presenter is no longer referring to a respective slide or shared document, the system may perform one or more actions as illustrated at steps 515, 520, and 525.

In embodiments, the system may expand the video thumbnail when a presenter has finished discussing the entirety of the visual data. This is illustrated at step 515. In this way, any users participating in the virtual conferencing session will be able to concentrate their focus solely on the presenter rather than the visual data since it is no longer being referred to.

In embodiments, the system may zoom in on the presenter if the system has determined the presenter is no longer referring to the visual content. This is illustrated at step 520. For example, in some screen sharing sessions, the presenter may be shown with both the slide presentation and the presenter in the video feed. If the system determines that the presenter has finished discussing a respective slide, the system may zoom in or display the presenter only in the video feed/thumbnail.

In embodiments, the system may transition to a next slide when a presenter is determined to be finished with discussing a respective slide. This is illustrated at step 525. For example, the system may automatically transition to a subsequent slide when the presenter is no longer discussing topics/subjects pertaining to the written content on the slide. In embodiments, this may be set to a predetermined time threshold. In other embodiments, this action may be initiated through spoken phrases identified by the system through natural language processing, such as detecting the phrase "next slide."

Figure 6:
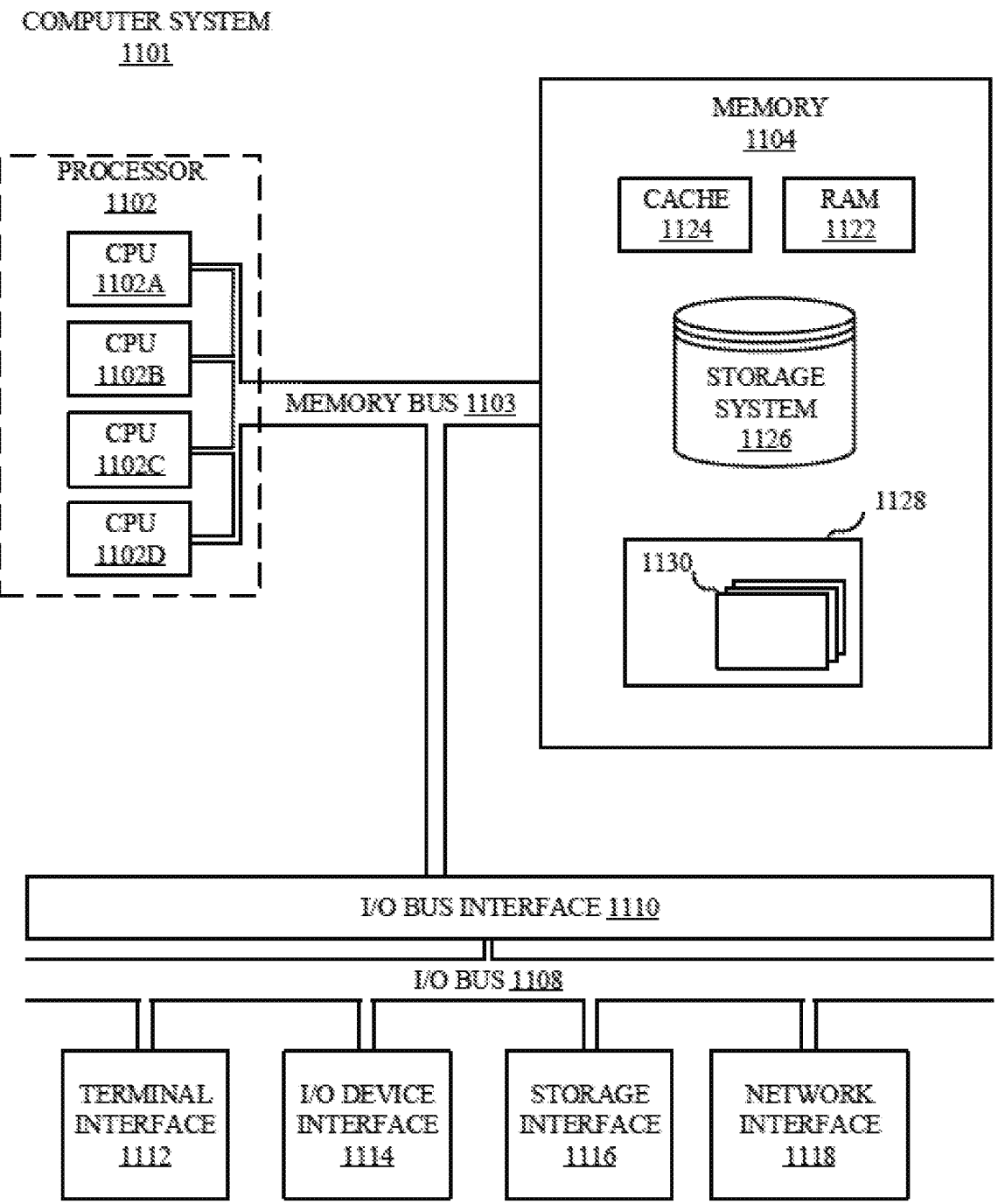
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 300, 400, and 500).

System memory subsystem 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 6 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

Figure 7:
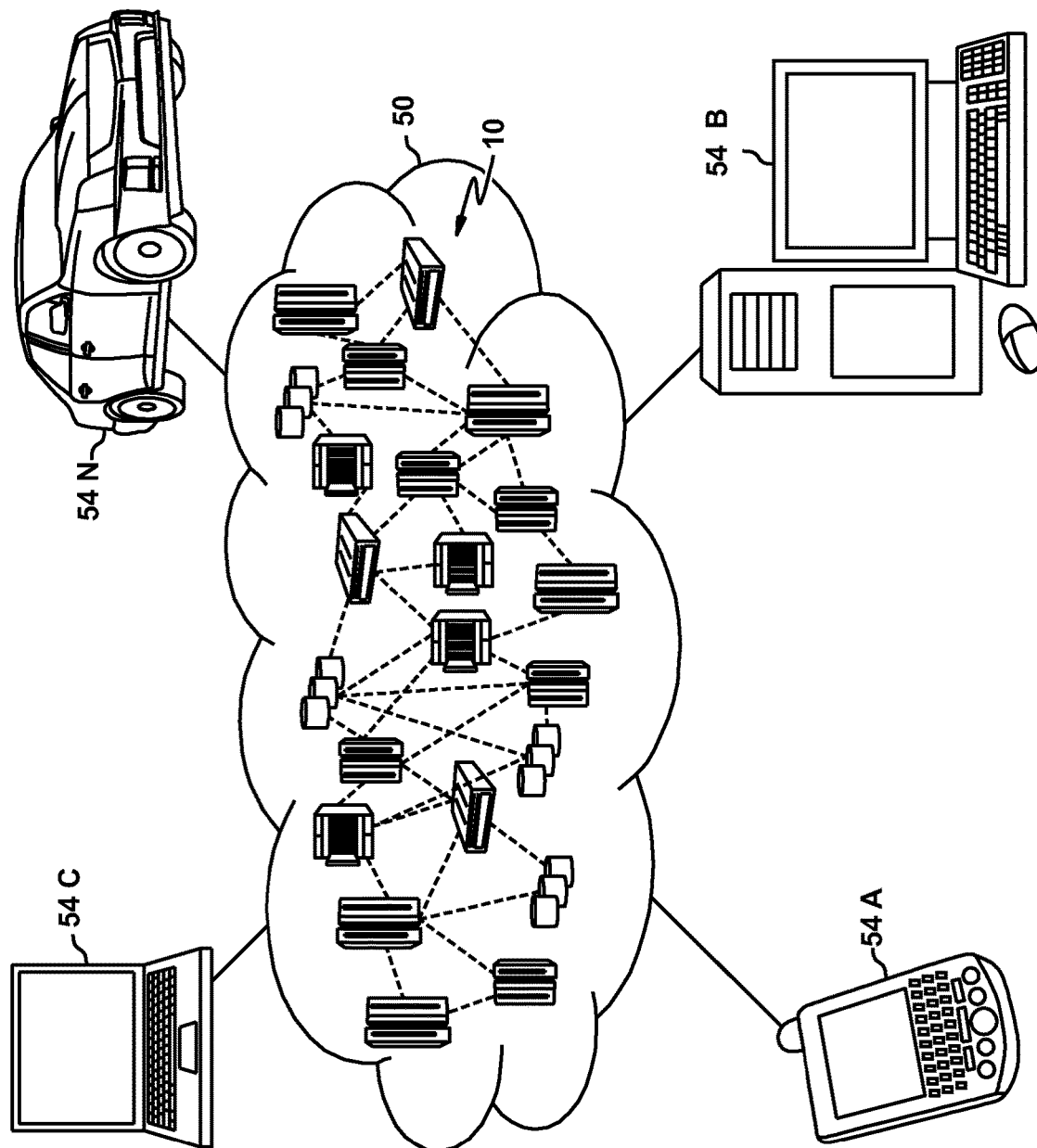
FIG. 7 depicts a cloud computing environment according to an embodiment of the present invention.

It is noted that FIG. 6 is intended to depict the representative major components of an exemplary computer system 1101. In some embodiments, however, individual components may have greater or lesser complexity than as represented in FIG. 7, components other than or in addition to those shown in FIG. 6 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
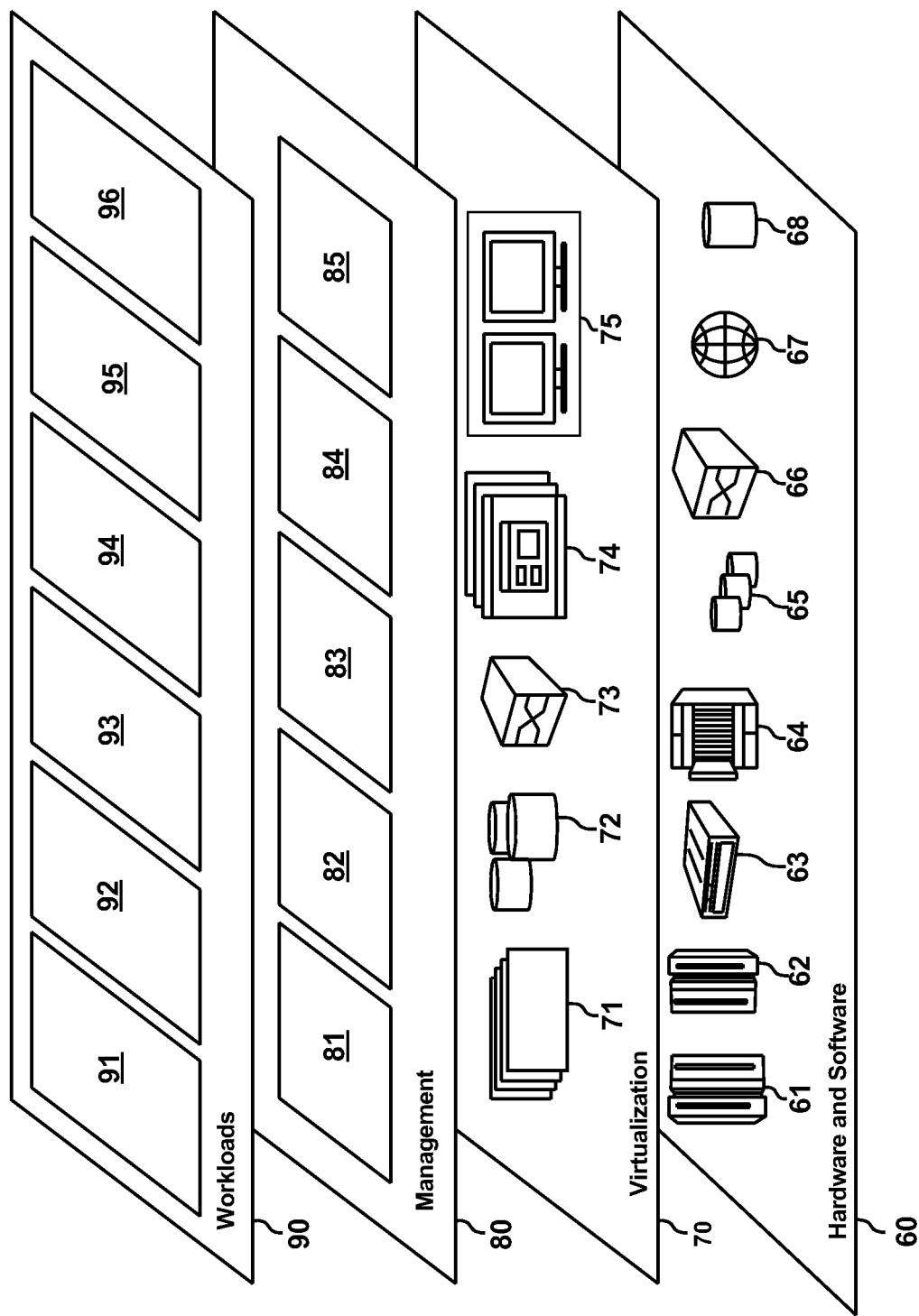
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving a data stream of a virtual conferencing session, wherein the data stream includes a presentation;
   analyzing visual data within a boundary of the presentation to identify a blank space area in the visual data, wherein identifying the blank space area comprises detecting, using image processing, an area in the visual data within the boundary of the presentation that does not contain any image and text;
   adjusting, automatically, a size and a position of a video thumbnail to fit in the blank space area once the visual data is displayed;
   displaying the visual data to one or more users of the virtual conferencing session;
   displaying the video thumbnail of a presenter in the blank space area;
   analyzing, using natural language processing, written content contained within the visual data and spoken content generated from the presenter;
   comparing a time period when the spoken content generated from the presenter last referred to a portion of the written content contained within the visual data to a predetermined time threshold;
   determining, in response to the predetermined time threshold being met, that the portion is a non-focus portion of the written content; and
   displaying the video thumbnail over the non-focus portion of the written content and the blank space area.

2. The computer-implemented method of claim 1, further comprising:
   detecting a transition from a first visual data to a second visual data;
   analyzing the second visual data to identify a second blank space area in the second visual data;
   displaying the second visual data to the one or more users of the virtual conferencing session; and
   repositioning the video thumbnail of the presenter in the second blank space area.

3. The computer-implemented method of claim 1, wherein substantially all pixels of the blank space area are effectively a single color.

4. The computer-implemented method of claim 1, further comprising:
   analyzing, using machine learning, historical data corresponding to actions performed by one or more users when manually positioning the video thumbnail relative to the visual data;
   identifying, in response to analyzing the historical data, preferences for a current user for positioning the video thumbnail relative to the visual data; and
   updating, automatically and in response to the identifying, a user profile for the current user with the identified preferences for positioning the video thumbnail relative to the visual data.

5. The computer-implemented method of claim 4, wherein the historical data includes crowdsourced data received from one or more other users.

6. The computer-implemented method of claim 1, further comprising:
   analyzing, using natural language processing, spoken content from the data stream, wherein the spoken content is generated by the presenter;
   determining, based on the analyzing, that the presenter is no longer referring to the visual data; and
   performing an action.

7. The computer-implemented method of claim 6, wherein the action is selected from the group consisting of:
   expanding the video thumbnail;
   zooming in on the presenter displayed in the video thumbnail; and
   transitioning to a second visual data.

8. The computer-implemented method of claim 4, wherein identifying preferences for a current user for positioning the video thumbnail relative to the visual data comprises:
   grouping, using unsupervised learning algorithms, identified blank spaces from the historical data and historical positioning of the video thumbnail in relation to the identified blank spaces;
   deriving placement properties from the identified blank spaces and the historical positioning of the video thumbnail from the historical data; and
   relating the derived placement properties with the preferences by using the placement properties to predict the position and the size of the video thumbnail in a current virtual conferencing session.

9. The computer-implemented method of claim 2, wherein the presentation is an electronic document and wherein the detected transition indicates a user is scrolling from a first page to a second page.

10. The computer-implemented method of claim 1, further comprising:
    readjusting the size of the video thumbnail to accommodate a chat box, wherein both the video thumbnail and the chat box fit in the blank space area; and
    displaying the video thumbnail and the chat box in the blank space area.

11. A virtual conferencing system, comprising:
    a processor; and a computer-readable storage medium communicatively coupled to the processor and storing program instructions which, when executed by the processor, cause the processor to perform a method comprising:

receiving a data stream of a virtual conferencing session, wherein the data stream includes a presentation, spoken content of a presenter, and a video thumbnail of a presenter;

analyzing, using natural language processing, written content contained within visual data and spoken content generated from the presenter;

comparing a time period when the spoken content generated from the presenter last referred to a portion of the written content contained within the visual data to a time threshold;

determining, in response to the time threshold being met, that the portion is a non-focus portion of the written content; and displaying the video thumbnail over the non-focus portion of the written content.

12. The virtual conferencing system of claim 11, wherein the method includes analyzing visual data within a boundary of the presentation to identify a blank space area in the visual data, wherein identifying the blank space area comprises detecting, using image processing, an area in the visual data within the boundary of the presentation that does not contain any image and text, wherein substantially all pixels of the blank space area are effectively a single color.

13. The virtual conferencing system of claim 11, further comprising:

analyzing, using machine learning, historical data corresponding to actions performed by one or more users when manually positioning the video thumbnail relative to the visual data;

identifying, in response to analyzing the historical data, preferences for a current user for positioning the video thumbnail relative to the visual data; and updating, automatically and in response to the identifying, a user profile for the current user with the identified preferences for positioning the video thumbnail relative to the visual data.

14. The virtual conferencing system of claim 11, further comprising:

analyzing, using natural language processing, the spoken content;

determining, based on the analyzing, that the presenter is no longer referring to the visual data; and performing an action.

15. The virtual conferencing system of claim 14, wherein the action is selected from the group consisting of:

expanding the video thumbnail;

zooming in on the presenter displayed in the video thumbnail; and transitioning to a second visual data.

16. The virtual conferencing system of claim 11, wherein the method includes iteratively performing the analyzing, using natural language processing, written content contained within the visual data and spoken content generated from the presenter; comparing a timing period when the spoken content generated from the presenter last referred to a second portion of the written content contained within the visual data to a timing threshold; determining, in response to the timing threshold being met, that the second portion is a new non-focus portion of the written content; and displaying the video thumbnail over new non-focus portion of the written content.

17. A computer program product comprising a computer-readable storage medium having program instructions embodied therewith, wherein the computer-readable storage medium is not a transitory signal per se, the program instructions executable by a processor to cause the processor to perform a method comprising:

analyzing, using natural language processing, written content contained within visual data and spoken content generated from a presenter;

comparing a time period when the spoken content generated from the presenter last referred to a portion of the written content contained within the visual data to a time threshold;

determining, in response to the time threshold being met, that the portion is a non-focus portion of the written content; and displaying a video thumbnail over the non-focus portion of the written content.

18. The computer program product of claim 17, further comprising:

analyzing, using machine learning, historical data corresponding to actions performed by the one or more users when manually positioning the video thumbnail relative to the visual data;

identifying, in response to analyzing the historical data, preferences for a current user for positioning the video thumbnail relative to the visual data; and updating, automatically and in response to the identifying, a user profile for the current user with the identified preferences for positioning the video thumbnail relative to the visual data.

19. The computer program product of claim 17, further comprising:

analyzing, using natural language processing, the spoken content;

determining, based on the analyzing, that the presenter is no longer referring to the visual data; and performing an action.

20. The computer program product of claim 17, wherein the action is selected from the group consisting of:

expanding the video thumbnail;

zooming in on the presenter displayed in the video thumbnail; and transitioning to a second visual data.

* * * * *